United States Patent
Suh et al.

(10) Patent No.: US 9,959,457 B2
(45) Date of Patent: May 1, 2018

(54) APPARATUS AND METHOD FOR EXTRACTING FEATURE OF IMAGE INCLUDING OBJECT

(71) Applicant: Samsung Electronics Co., Ltd., Suwon-si, Gyeonggi-do (KR)

(72) Inventors: Sungjoo Suh, Seoul (KR); Yun Fu, Boston, MA (US); Zhengming Ding, Boston, MA (US); Chang Kyu Choi, Seongnam-si (KR); Jae-Joon Han, Seoul (KR)

(73) Assignees: SAMSUNG ELECTRONICS CO., LTD., Gyeonggi-do (KR); NORTHEASTERN UNIVERSITY, Boston, MA (US)

( * ) Notice: Subject to any disclaimer, the term of this patent is extended or adjusted under 35 U.S.C. 154(b) by 63 days.

(21) Appl. No.: 14/858,082

(22) Filed: Sep. 18, 2015

(65) Prior Publication Data
US 2016/0086047 A1  Mar. 24, 2016

(30) Foreign Application Priority Data
Sep. 24, 2014  (KR) .................. 10-2014-0127389

(51) Int. Cl.
*G06K 9/00*  (2006.01)
*G06K 9/62*  (2006.01)

(52) U.S. Cl.
CPC ....... *G06K 9/00288* (2013.01); *G06K 9/6247* (2013.01)

(58) Field of Classification Search
CPC .......... G06K 9/00248; G06K 9/00288; G06K 9/0061; G06K 9/6232

USPC .................................................. 382/159, 197
See application file for complete search history.

(56) References Cited

U.S. PATENT DOCUMENTS

| 7,054,468 | B2 * | 5/2006 | Yang | ................. | G06K 9/00275 345/16 |
| 8,488,873 | B2 | 7/2013 | Rousson et al. | | |
| 8,498,454 | B2 | 7/2013 | Tu et al. | | |
| 8,515,180 | B2 * | 8/2013 | Kato | ................. | G06K 9/00281 382/195 |
| 9,129,149 | B2 * | 9/2015 | Kameyama | ........ | G06K 9/00275 |
| 2008/0279424 | A1 * | 11/2008 | Berrani | ............. | G06K 9/00288 382/118 |

(Continued)

OTHER PUBLICATIONS

Zhang, et al. (Low-rank representation based discriminative projection for robust feature extraction), pp. 13-20, 2013, School of Computer Science, China.*

(Continued)

*Primary Examiner* — Daniel Mariam
(74) *Attorney, Agent, or Firm* — Harness, Dickey & Pierce, P.L.C.

(57) ABSTRACT

At least one example embodiment discloses a method of converting a vector corresponding to an input image. The method includes receiving first-dimensional vector data associated with an input image, the input image including an object and converting the received first-dimensional vector data to second-dimensional vector data based on a projection matrix with an associated rank. A first dimension of the first-dimensional vector data is higher than a second dimension of the second-dimensional vector data.

24 Claims, 11 Drawing Sheets

(56) References Cited

U.S. PATENT DOCUMENTS

2013/0191425 A1     7/2013   Porikli et al.
2014/0072184 A1     3/2014   Wang et al.

OTHER PUBLICATIONS

Guangcan Liu et al. "Robust Subspace Segmentation by Low-Rank Representation". Proceedings of the 27th International Conference on Machine Learning. 2010.

Qiong Cao et al. "Similarity Metric Learning for Face Recognition". Computer Vision Foundation. 2013. p. 2408-2415.

Dan-Theodor Oneată. "Fast low-rank metric learning". University of Edinburgh. Oct. 2011. p. 1-79.

Aurélien Bellet et al. "A Survey on Metric Learning for Feature Vectors and Structured Data". Université de Saint-Etienne. 2014. p. 1-59.

Chang Huang et al. "Large Scale Strongly Supervised Ensemble Metric Learning, with Applications to Face Verification and Retrieval". Technical Report of NEC Laboratories America. 2011. p. 1-8.

Jason V. Davis et al. "Information-Theoretic Metric Learning". Proceedings of the 24th International Conference on Machine Learning. 2007.

Daryl K. H. Lim et al. "Robust Structural Metric Learning". Proceedings of the 30th International Conference on Machine Learning. 2013.

Amir Globerson et al.. "Metric Learning by Collapsing Classes". Advances in neural information processing systems conference. 2005. p. 451-458.

Yangmuzi Zhang et al. "Learning Structured Low-rank Representations for Image Classification". IEEE Conference on Computer Vision and Pattern Recognition. 2013. p. 676-683.

Zhengming Ding et al. "Discriminative Low-Rank Metric Learning for Face Recognition". 11th IEEE International Conference and Workshops. 2015. p. 1-6.

Thomas Mensink et al. "Large Scale Metric Learning for Distance-Based Image Classification". Inria Technical Report. Sep. 2012. p. 1-27.

\* cited by examiner

APPARATUS AND METHOD FOR EXTRACTING FEATURE OF IMAGE INCLUDING OBJECT

CROSS-REFERENCE TO RELATED APPLICATION

This application claims the priority benefit of Korean Patent Application No. 10-2014-0127389, filed on Sep. 24, 2014, in the Korean Intellectual Property Office, the entire disclosure of which is incorporated herein by reference.

BACKGROUND

1. Field

At least some example embodiments relate to an apparatus and method for extracting a feature of an object from an image.

2. Description of the Related Art

In image processing and interpretation, a human face is an important factor in visual discrimination and identification. An analysis on face recognition and interpretation of facial expressions has been extensively developed since the early 1990s.

Recently, to identify a person and search for a face in a flow of images, moving picture experts group (MPEG)-7 face descriptors have been proposed. In comparison to a face recognition algorithm according to the related art, MPEG-7 face descriptors have a main function of more quickly and effectively searching for the same facial images as an asked image.

A face recognition technology may refer to a technology for identifying at least one person in a still image or a moving image based on a face database provided for a face of the person.

SUMMARY

Because a face is heavily changed due to a change in illumination, pose, or posture, and is extremely sensitive to surroundings, a recognition rate may be lower than that of the biometrics technology. At least some example embodiments relate to a method of converting a vector corresponding to an input image.

In at least some example embodiments, the method may include receiving first-dimensional vector data associated with an input image, the input image including an object, and converting the received first-dimensional vector data to second-dimensional vector data based on a projection matrix with an associated rank, wherein a first dimension of the first-dimensional vector data is higher than a second dimension of the second-dimensional vector data.

The associated rank of the projection matrix may be lower than a set rank threshold.

The projection matrix may be based on a covariance matrix corresponding to learning vector data, the learning vector data corresponding to learning images.

The converting may convert the first dimensional vector data to the second-dimensional vector data such that the second-dimensional vector data is the same as vector data, the desired vector data may include a sparse error matrix and a product of basis vector data and a coefficient matrix.

The projection matrix may be based on a covariance matrix-based metric calculation, a rank of the coefficient matrix, and the associated rank of the projection matrix.

The basis vector data may be based on the input image and a covariance matrix corresponding to learning vector data.

The receiving may receive first-image vector data associated with a first image, and second-image vector data associated with at least one second image. The converting may convert a dimension of each of the first-image vector data and the second-image vector data to the second dimension based on the projection matrix. The method may further include comparing the first image and each of the at least one second image based on the first-image vector data and the second-image vector data corresponding to the second dimension.

At least some example embodiments relate to a method of learning a projection matrix to convert a dimension of obtained vector data associated with an input image.

In at least some example embodiments, the method may include receiving learning vector data corresponding to each of a plurality of learning images, and learning the projection matrix from the learning vector data, the projection matrix having an associated rank.

The learning may include determining the projection matrix such that the associated rank of the projection matrix is lower than a set rank threshold.

The learning may include generating the projection matrix based on a covariance matrix corresponding to the learning vector data.

The learning may include determining the projection matrix such that a difference between elements corresponding to a same object in the learning vector data is lowered and that a difference between elements corresponding to different objects in the learning vector data is increased.

The learning may include determining the projection matrix such that the obtained vector data is identical to desired vector data, the desired vector data includes a sparse error matrix and a product of basis vector data and a coefficient matrix.

The learning may include determining the projection matrix based on a covariance matrix-based metric calculation, the associated rank of the coefficient matrix, and a rank of the projection matrix.

The learning may include generating the basis vector data from the input image based on a covariance matrix corresponding to the learning vector data.

At least some example embodiments relate to a method of converting an input image including an object to discriminative feature data.

In at least some example embodiments, the method may include extracting vector data associated with the input image from the input image, and converting the extracted vector data to the discriminative feature data based on a projection matrix, the projection matrix being based on a covariance matrix corresponding to learning vector data, the projection matrix may have an associated rank.

The extracting may include receiving the input image, detecting an object area including the object from the input image, and normalizing the input image based on the object area.

The method may further include computing a similarity based on the discriminative feature data and feature data extracted from another image, and determining the object to be identical to an object in the another image, if the similarity is greater than a threshold.

The method may further include computing a similarity based on the discriminative feature data and stored feature data, the stored feature data corresponding to a plurality of selected objects, and determining the object from the input image to be identical to one of the plurality of selected objects if the similarity is greater than a set threshold.

At least some example embodiments relate to an apparatus for converting a vector corresponding to an input image.

In at least some example embodiments, the apparatus may include a vector receiver configured to receive first-dimensional vector data associated with an input image, the input image including an object, and a vector converter configured to convert the received first-dimensional vector data to second-dimensional vector data based on a projection matrix.

At least some example embodiments relate to an apparatus for learning a projection matrix to convert a dimension of obtained vector data associated with an input image.

In at least some example embodiments, the apparatus may include a learning vector receiver configured to receive learning vector data corresponding to each of a plurality of learning images, and a projection matrix learner configured to learn the projection matrix from the learning vector data, the projection matrix having an associated rank.

At least some example embodiments relate to an apparatus for converting an input image including an object to discriminative feature data.

In at least some example embodiments, the apparatus may include a vector extractor configured to extract vector data associated with the input image from the input image, and a feature converter configured to convert the extracted vector data to the discriminative feature data based on a projection matrix, the projection matrix being generated based on a covariance matrix corresponding to learning vector data and having a low rank.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
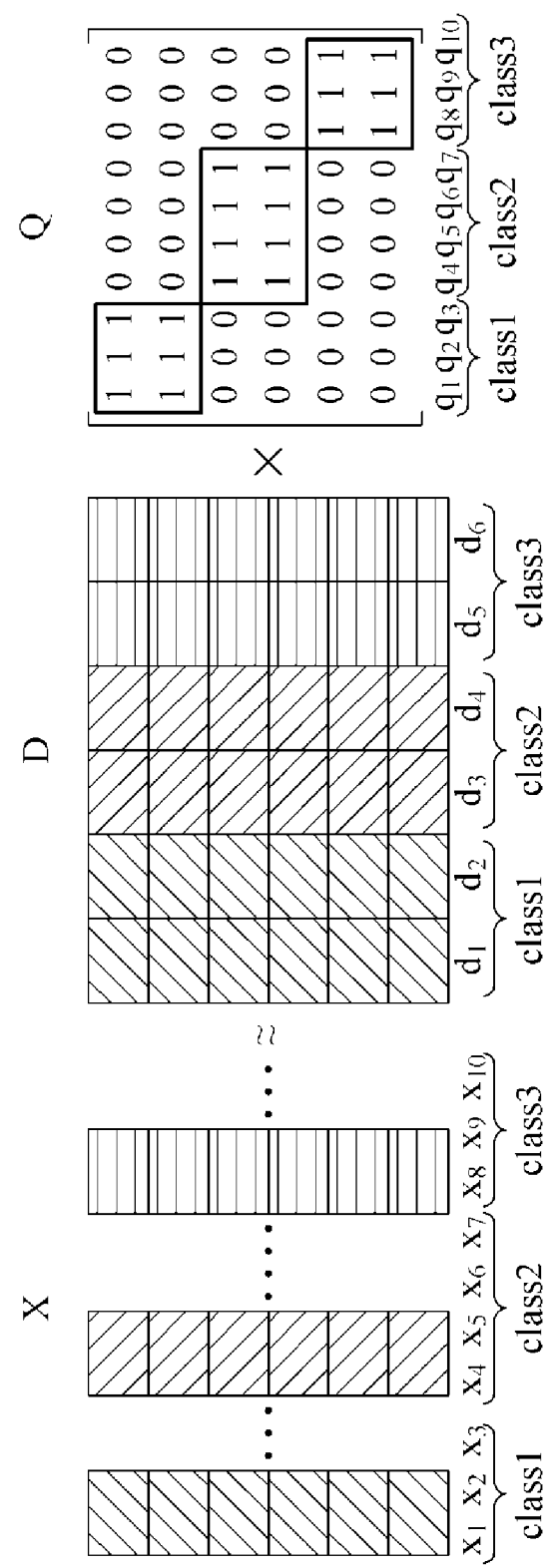
FIG. 1 illustrates vector data corresponding to images classified by classes according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, in the present disclosure, vector data may refer to data in a vector form. Vector data may be, for example, a column vector, and an element of the vector data may be, for example, a real number. However, the element of the vector data is not limited to the real number, and may be, for example, a binary number, or an integer.

Additionally, an input image may refer to an image input to an apparatus, and may be received in a form of vector data. The input image may be, for example, video or a still image. In an example, when an input image corresponds to video including a plurality of frames, a single piece of vector data may correspond to a single frame. In another example, when an input image corresponds to a still image, a single piece of vector data may correspond to the input image.

The input image may include an object. The object may include, for example, humans, inanimate objects, animals, and the like. Also, the object may include, for example, a person's face, a person's body, a person's hand, and the like.

Each of a plurality of input images may include an image including the same object or different objects. A portion of input images including the same object may include different images representing the same object. For example, an input image may include images representing the same object in different poses, different angles, different locations, and the like.

The input images may be classified as a class corresponding to the same object. A single class may include, for example, at least one of a set of input images corresponding to the same object, and a set of vector data. A number of classes to be generated may correspond to a number of objects.

FIG. 1 illustrates vector data corresponding to images classified by classes according to at least one example embodiment.

In FIG. 1, N input images X may be represented by $X=[x_1, x_2, \ldots, x_N]$ as a set of vector data. N may be an integer equal to or greater than "1," and each of $x_1$ through $x_N$ denotes vector data corresponding to a single input image.

A dictionary D may refer to a set of vectors used to linearly represent a data space, and may include sub-dictionaries used to represent a data space corresponding to each of the classes. For example, when M sub-dictionaries exist, the dictionary D may be represented by $[d_1, d_2, \ldots, d_M]$. In this example, M may be an integer equal to or greater than "1," and each of $d_1$ through $d_M$ denotes a sub-dictionary used to represent each of the classes and may be learned for each class. The number of sub-dictionaries, that is, M may be determined by optimization and/or using empirical data to represent an entire data space.

An ideal representation Q may refer to a set of coefficients used to represent vector data corresponding to the input image X from the dictionary D, and may be represented by $Q=[q_1, q_2, q_3, \ldots, q_N]$. Each of $q_1$ through $q_N$ may be a column vector of coefficients used to represent the vector data $x_1$ through $x_N$ corresponding to the input image X from the dictionary D. For example, a matrix multiplication of the dictionary D and the ideal representation Q may represent vector data corresponding to the input image X.

For example, in FIG. 1, ten pieces of vector data may be included in the input image X, a class 1 may include the vector data $x_1$, $x_2$, and $x_3$, a class 2 may include the vector data $x_4$, $x_5$, $x_6$, and $x_7$, and a class 3 may include the vector data $x_8$, $x_9$, and $x_{10}$. The classes 1 through 3 may correspond to different objects. The input image X of FIG. 1 may be decomposed into the matrix multiplication of the dictionary D and the ideal representation Q. However, the number of the classes, and the number of pieces of the vector data are not limited to those described above and accordingly, may vary depending on example embodiments.

The number of the sub-dictionaries (for example, a form of a column vector) in the dictionary D may be determined and/or optimized for each class. In FIG. 1, sub-dictionary with size 2 may correspond to each of the classes. For example, sub-dictionaries $d_1$ and $d_2$ may correspond to the class 1, sub-dictionaries $d_3$ and $d_4$ may correspond to the class 2, and sub-dictionaries $d_5$ and $d_6$ may correspond to the class 3. However, the number of the sub-dictionaries is not limited thereto and accordingly, may vary depending on example embodiments.

For example, when an arbitrary input image belongs to a predetermined and/or selected class, a column vector used to represent the arbitrary input image in the ideal representation Q may include, as "0," coefficients other than a coefficient used to represent the arbitrary input image. In the ideal representation Q of FIG. 1, coefficients used to represent an arbitrary input image are indicated by a box. Column vectors $q_1$, $q_2$ and $q_3$ used to represent the class 1 may have coefficients of "1" in a first row and a second row, column vector $q_4$, $q_5$, $q_6$ and $q_7$ used to represent the class 2 may have coefficients of "1" in a third row and a fourth row, and column vectors $q_8$, $q_9$ and $q_{10}$ used to represent the class 3 may have coefficients of "1" in a fifth row and a sixth row. Elements other than the above-described elements may have coefficients of "0." FIG. 1 illustrates an example of a coefficient of "1" used to represent each of the classes, however, there is no limitation thereto. Accordingly, a coefficient may be an arbitrary real number, depending on example embodiments.

Figure 2:
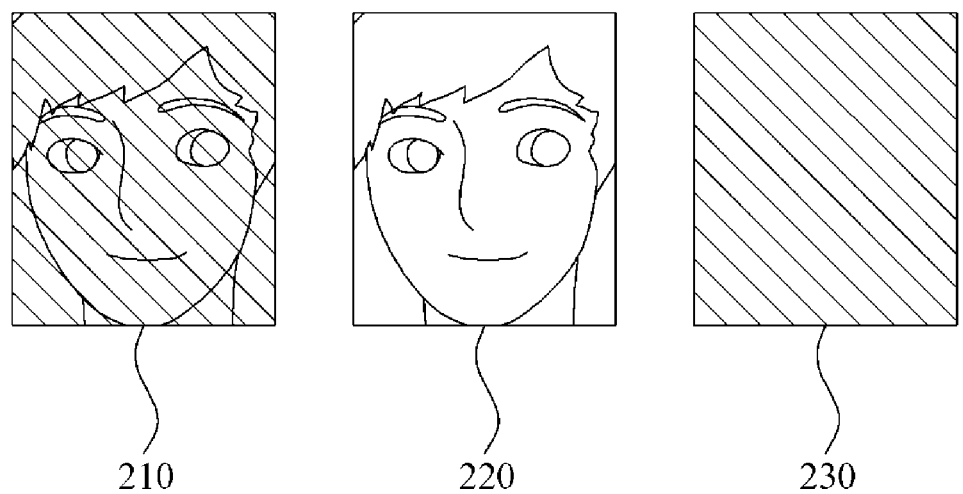
FIG. 2 illustrates vector data obtained by separating an error from vector data corresponding to an image according to at least one example embodiment.

FIG. 2 illustrates vector data obtained by separating an error from vector data corresponding to an image according to at least one example embodiment.

A situation in which an error does not occur is assumed in FIG. 1, however, decomposition of vector data corresponding to an input image in an example in which an error occurs may be represented, as shown in Equation 1 below.

$$X=DZ+E \qquad \text{[Equation 1]}$$

In Equation 1, X denotes an input image, D denotes a dictionary, Z denotes a coefficient matrix, and E denotes an error matrix. The input image X and the dictionary D may be identical to the input image X and the dictionary D of FIG. 1. Additionally, the coefficient matrix Z may refer to a set of coefficients used to represent an object included in the input image X based on the dictionary D, similarly to the ideal representation Q of FIG. 1. The error matrix E may include an error component with low relevance to an object representation in the input image X.

For example, in FIG. 2, the input image X may be used as the dictionary D in Equation 1 (for example, X=XZ+E). As shown in FIG. 2, an input image X 210 including an error (for example, noise) may be decomposed into XZ 220 and an error matrix E 230. The XZ 220 may be, for example, a representation in which the error matrix E 230 is removed from the input image X 210. The input image X 210 may include an object, for example, a face.

Figure 3:
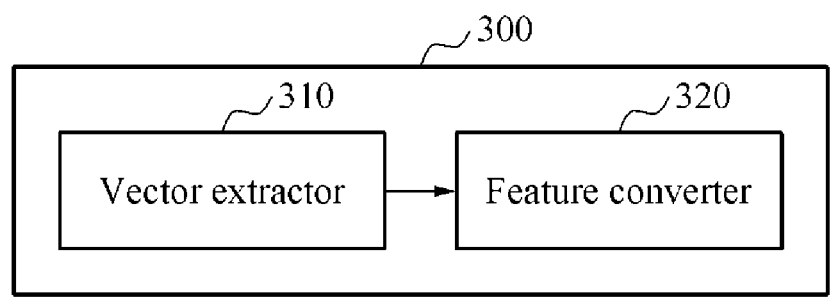
FIGS. 3 and 4 illustrate examples of a configuration of an apparatus for converting an input image including an object to discriminative feature data according to at least one example embodiment.
Figure 4:
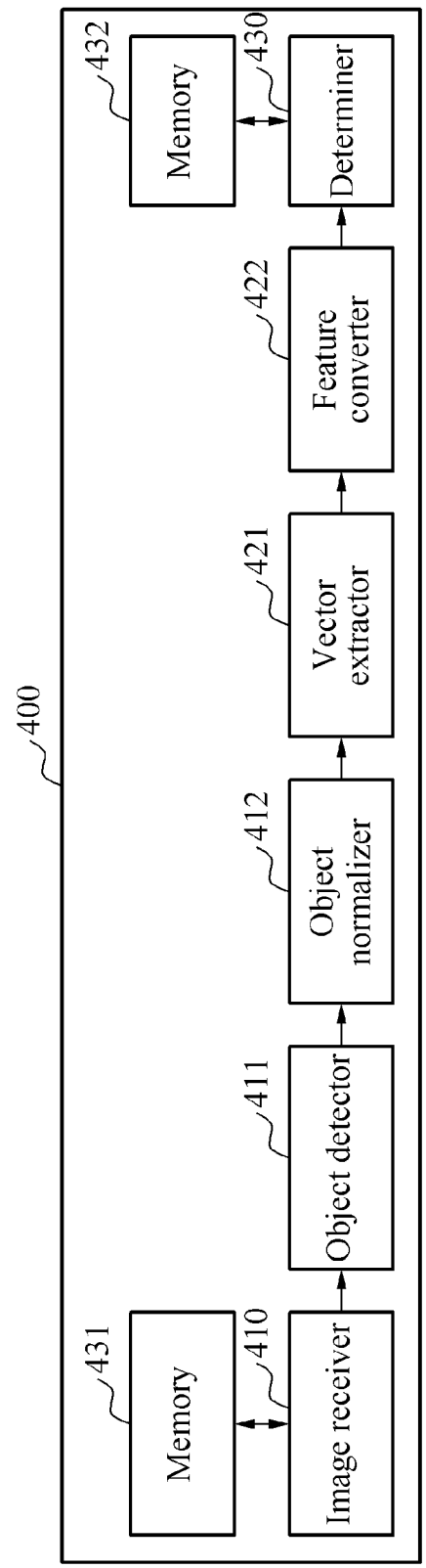

FIGS. 3 and 4 illustrate examples of a configuration of an apparatus for converting an input image including an object to discriminative feature data according to at least one example embodiment.

Referring to FIG. 3, an apparatus 300 for converting an input image including an object to discriminative feature data may include a vector extractor 310 and a feature converter 320.

The vector extractor 310 may extract vector data associated with the input image from the input image. In an example, the vector extractor 310 may extract a feature of the input image in the form of vector data. The vector extractor 310 may use a typical feature extraction scheme, for example, local binary patterns (LBP), or Gabor, to extract a feature of the input image in the form of vector data. In another example, the vector extractor 310 may extract the input image as a feature in the form of vector data.

The feature converter 320 may convert the extracted vector data to discriminative feature data based on a projection matrix. The projection matrix may be generated based on a covariance matrix corresponding to learning vector data, and may have a low rank. The discriminative feature data may be used to restore the input image. The learning vector data may be used to learn the projection matrix. Learning of the projection matrix will be further described with reference to FIGS. 5 through 7. In addition, the covariance matrix will be further described with reference to Equation 6 below.

For example, discriminative feature data of the input image may have a value that is associated with a point and that is more discriminative, in comparison to another image. In the present disclosure, discriminative information may refer to information allowing a distance between data points (for example, vector data) in the same class to decrease, while a distance between data points in different classes to increase.

According to an example embodiment, metric learning may be used to extract a feature of an input image. A metric in the metric learning may refer to calculation of a distance between features, which will be described with reference to FIG. 4 below. The metric learning may refer to learning of a more discriminative distance calculation scheme from provided learning data. The metric learning may exhibit good performance in a visual analysis application. Typical supervised metric learning schemes may increase a distance between data points in different classes, and may decrease a distance between data points in the same class.

A discriminative low-rank metric learning method, hereinafter referred to as a DLML method, may be used, and a projection matrix and a coefficient matrix may be constrained to be a low rank. The low rank may indicate that a rank of an arbitrary matrix is lower than a predetermined and/or selected (or set) rank threshold, and may be, for example, a state in which a matrix has a minimum rank value. The rank threshold may be set in advance to be a minimum rank of a matrix.

For example, the DLML method may remove redundant features, and may emphasize a global data structure by reducing noise. Additionally, the above-described low-rank projection matrix and low-rank coefficient matrix may be learned in a low-dimensional subspace, instead of a high-dimensional subspace, in the input image. The DLML method will be further described with reference to FIGS. 5 through 7.

Referring to FIG. 4, an apparatus 400 for converting an input image including an object to discriminative feature data may include an image receiver 410, an object detector 411, an object normalizer 412, a vector extractor 421, a feature converter 422, and a determiner 430.

When the image receiver 410 receives an input image, the object detector 411 may detect an object area including the object from the input image, and the object normalizer 412 may normalize the input image based on the object area. The vector extractor 421 may extract vector data associated with the input image from the normalized input image. The vector data associated with the input image may be, for example, vector data representing a feature of the input image, or vector data representing the input image. The feature converter 422 may convert the extracted vector data to discriminative feature data based on the above-described projection matrix.

For example, the image receiver 410 may receive an input image. In this example, the image receiver 410 may receive the input image from an external apparatus via a wired or wireless interface. In another example, the image receiver 410 may receive an input image stored in a memory 431 built in the apparatus 400.

The object detector 411 may detect the object area from the input image based on a predetermined and/or selected algorithm. For example, when the object is a face of a person, the object detector 411 may detect a face area based on a face recognition algorithm. The predetermined and/or selected algorithm may include, for example, any algorithms for processing an image to recognize a predetermined and/or selected object.

The object normalizer 412 may normalize the input image based on the object area detected to extract vector data. The object normalizer 412 may normalize the input image, to satisfy a predetermined and/or selected requirement associated with a size, a pixel, a brightness and a resolution of the input image. For example, the object normalizer 412 may adjust the input image to an image including an object area with a predetermined and/or selected size. The object normalizer 412 may normalize the input image, to compare images that are different in size, pixels, brightness and resolution, under the same requirement.

The determiner 430 may determine whether two images are similar to each other based on calculation of a distance between features. For example, when a sum of distances between features of the two images (for example, discriminative feature data) decreases, the two images may be determined to be similar. When the sum increases, the two images may not be determined to be dissimilar. When the sum is less than a predetermined and/or selected threshold distance, the two images may be determined to be similar. In this example, the features may be extracted in the form of vector data (for example, discriminative feature data), and a distance between vector data may be calculated, as shown in Equation 2 below.

$$\text{distance}(A,B) = \sqrt{(a_1-b_1)^2 + (a_2-b_2)^2 + \ldots + (a_n-b_n)^2} \quad \text{[Equation 2]}$$

In Equation 2, distance(A, B) denotes a function representing a distance between vector data A and B, $a_1$ through $a_n$ denote elements of the vector data A, and $b_1$ through $b_n$ denote elements of the vector data B, where n may be an integer equal to or greater than "1," and may have no relevance to N of FIG. 1. For example, the vector data A and B may include values corresponding to features extracted from different images, respectively.

In an example, the determiner 430 may compute a similarity by comparing a feature extracted from the input image to a feature extracted from another image. The similarity may be computed as shown in Equation 3 below.

$$\text{similarity} = \cos(\theta) = \frac{A \cdot B}{\|A\|\|B\|} = \frac{\sum_{i=1}^{n} a_i b_i}{\sqrt{\sum_{i=1}^{n} a_i^2} \sqrt{\sum_{i=1}^{n} b_i^2}} \quad \text{[Equation 3]}$$

In Equation 3, A and B each denote vector data corresponding to a feature extracted from an image, and may be defined similarly to the vector data A and B in Equation 2.

In this example, when the similarity is greater than a predetermined and/or selected threshold similarity, the determiner 430 may determine that an object included in the input image is identical to an object included in the other image. As described above, the determiner 430 may determine whether a similarity between the two images is greater than the predetermined and/or selected threshold similarity, through a one-to-one comparison. For example, whether the two images correspond to the same object (for example, a face) may be determined.

In another example, the determiner 430 may compute a similarity by comparing an extracted feature to prestored features corresponding to a plurality of objects stored in a memory 432. While the memory 431 and the memory 432 are illustrated as separate memories, the memory 431 and the memory 432 may be a single memory. The determiner 430 may determine that an object included in an input image is identical to an object corresponding to a feature with a similarity that is greater than a predetermined and/or selected threshold similarity among the prestored features. The features corresponding to the objects may be stored in advance in the memory 432, which may be an object database. The determiner 430 may identify an identifier (ID) with a highest similarity, through a one-to-one comparison. For example, an unknown object (for example, a face) may be identified from a provided image based on a prestored database.

Figure 5:
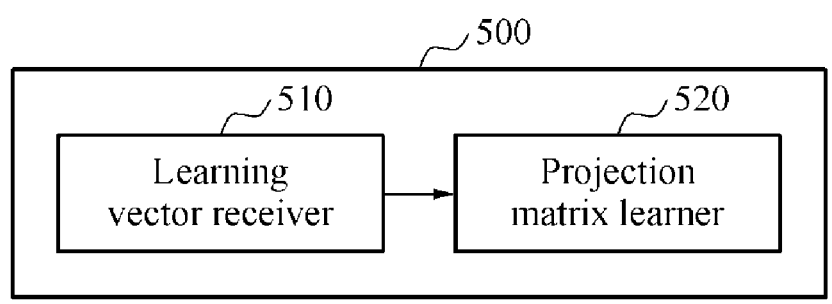
FIG. 5 illustrates a configuration of an apparatus for learning a projection matrix to convert a dimension of vector data associated with an input image according to at least on example embodiment.

FIG. 5 illustrates a configuration of an apparatus 500 for learning a projection matrix to convert a dimension of vector data associated with an input image according to at least one example embodiment.

Referring to FIG. 5, the apparatus 500 may include a learning vector receiver 510 and a projection matrix learner 520. The vector data associated with the input image may be, for example, first-dimensional vector data, that is, high-dimensional vector data. When a projection matrix is multiplied by the first-dimensional vector data, the first-dimensional vector data may be converted to second-dimensional vector data, that is, low-dimensional vector data.

The vector data associated with the input image may be, for example, the input image represented in the form of vector data, or a feature of the input image represented in the form of vector data.

The learning vector receiver 510 may receive learning vector data corresponding to each of a plurality of learning images. The learning images may be, for example, sample images determined in advance to learn a projection matrix. The learning vector data may include vector data corresponding to a feature of each of the learning images.

The projection matrix learner 520 may learn a projection matrix with a low rank from the learning vector data. For example, the projection matrix may be learned by metric learning that will be described below.

A face recognition scheme according to the related art may exhibit sufficient recognition performance under a limited condition. However, when the limited condition is not satisfied, for example, when a facial image is captured in an environment in which a wide intra-personal variation occurs, performance may be reduced. Face recognition may be classified, for example, into two types.

In an example, a person may be recognized, by predicting an ID through a comparison of an input image including a face to a plurality of prestored features. In another example, whether a provided pair of images is captured from the same person may be determined.

The metric learning used in the present disclosure may be performed by the apparatus 500 based on illumination, an expression, a pose, a resolution, a background, and the like of an input image, when the input image includes a person's face as an object.

The metric learning performed by the apparatus 500 may learn a discriminative distance metric, so that a distance between image features in the same class may decrease while that a distance between image features in different classes may increase. For example, the metric learning may correspond to a process of searching for a linear projection. The metric learning may learn a linear transformation to map a sample object to a new feature space.

Furthermore, low-rank metric learning may be used by the apparatus 500 to apply a low-rank constraint to a coefficient matrix and a metric matrix. The metric matrix may be decomposed into a projection matrix. Accordingly, the low-rank metric learning may be transformed to learning of a low-rank projection matrix.

A low-rank representation (LRR) may be used by the apparatus 500 to emphasize a global structure of data. The global structure may be drawn from various subspaces. The LRR may be a lowest rank representation among all candidates that may be represented as linear combinations of a basis.

A coefficient matrix learned in the low-rank metric learning may discover various subspace structures. Additionally, a sparse error term may compensate for noise. Furthermore, the low-rank constraint may be used to learn a more robust subspace.

To learn the above-described subspace, supervised regularization based robust subspace (SRRS), and low-rank transfer subspace learning (LTSL) may be used by the apparatus 500. In the present disclosure, the above-described LRR and subspace learning may be implemented by the apparatus 500 in a unified framework.

According to an example embodiment, the DLML method may constrain all of a projection matrix, a coefficient matrix, and a data representation (for example, a product of a coefficient matrix and a basis matrix) to be a low rank. Additionally, by building a low-dimensional space through the projection matrix, a distance between features in the same class may decrease while a distance between features in different classes may increase. For example, a low-rank constraint on the projection matrix, the coefficient matrix and the data representation may be used to remove non-informative features from the input image.

In a metric learning method, a Mahalanobis-like distance matrix M may be used by the apparatus 500. Generally, a low-dimensional projection P into an Euclidean space may be used to factorize $M=PP^T$, to ensure a positive semidefinite (PSD) constraint on the Mahalanobis-like distance matrix M.

For example, the projection matrix may be learned by the apparatus 500 to maximize a sum of distances between dissimilar pairs for metric learning, while maintaining an upper bound on a sum of squared distances between similar pairs. A side-information based linear discriminant analysis (SILD) approach as a modification of a linear discriminant analysis (LDA) may be applied to face verification.

Additionally, as a novel regularization framework, similarity metrics may be learned by the apparatus 500 by incorporating robustness to large intra-personal variations and discriminative power of novel similar metrics.

In a discriminative deep metric learning (DDML) method, by training a deep neural network, a set of hierarchical nonlinear transformations may be learned by the apparatus 500 to project face pairs into the same feature subspace.

Furthermore, a structural term may be incorporated into a metric matrix so that non-informative features may be removed. For example, direct low rank constraints may be added by the apparatus 500 to a projection matrix P. Additionally, a data global structure may be learned and redundant features may be removed by the apparatus 500, through an LRR derived from a feature space and a sample space.

A projection matrix according to at least one example embodiment may be learned by the apparatus 500 using the DLML method.

For example, $X=[x_1, x_2, \ldots, x_n]$ may be assumed as a training set, where $x_i \in \mathbb{R}^m$ denotes i-th learning vector data, and m denotes a total size (for example, a number of pieces of learning vector data). An objective function to maintain all data points within the same class, while separating all data points in different classes from each other may be represented as shown in Equation 4 below.

$$\min_M \sum_{i,j}^n \|x_i - x_j\|_M^2 \cdot S_{ij} \qquad \text{[Equation 4]}$$

$$\text{s.t.} \quad M \succeq 0, \sum_{ij}^n \|x_i - x_j\|_M^2 \cdot D_{ij} \geq 1$$

In Equation 4, a Mahalanobis distance between two pieces of vector data may be represented by $\|x_i-x_j\|M = \sqrt{(x_i-x_j)^T M(x_i-x_j)}$ where $x_j$ represents j-th learning vector data, and M is the Mahalanobis like distance matrix. $S_{ij}=1$ indicates that $x_i$ and $x_j$ belong to the same class, otherwise $S_{ij}=0$. $D_{ij}=1$ indicates that $x_i$ and $x_j$ belong to different classes, otherwise $D_{ij}=0$.

For example, $M \in \mathbb{R}^{m \times m}$ may be decomposed into $M=PP^T$, in which $P \in \mathbb{R}^{m \times p}$ and $p \leq m$. Accordingly, $\|x_i-x_j\|_M$ may be rewritten as $\|x_i-x_j\|_M = \|P^T(x_i-x_j)\|_2$. As a result, metric learning may be treated by the apparatus 500 as seeking a linear projection P. Equation 4 may be transformed to Equation 5 shown below.

$$\min_P \frac{tr(P^T X \mathcal{L}_S X^T P)}{tr(P^T X \mathcal{L}_D X^T P)} \qquad \text{[Equation 5]}$$

In Equation 5, $\mathcal{L}_S$ denotes a Laplacian matrix of S, and $\mathcal{L}_D$ denotes a Laplacian matrix of D. In addition, tr(K) denotes a trace of a matrix K. The trace may be, for example, a function to add all diagonal term elements of a square matrix. Equation 5 may be an example of a variant of the SILD. Based on an intra-personal subspace that may definitely reduce large intra-personal variations, Equation 5 may be represented as an objective function of Equation 6 shown below.

$$\min_P \frac{tr(P^T C_S P)}{tr(P^T C_T P)} \qquad \text{[Equation 6]}$$

Equation 6 may represent a covariance matrix-based metric calculation. In the present disclosure, a metric calculation may be a mathematical representation associated with a degree of a decrease in a distance between pieces of vector data corresponding to the same class (for example, a numerator of Equation 6) and a degree of an increase in a distance between pieces of vector data corresponding to different classes (for example, a denominator of Equation 6).

In Equation 6, $C_S = X \mathcal{L}_S X^T$ denotes an intra-personal covariance matrix, however, there is no limitation thereto. Accordingly, $C_S = X \mathcal{L} X^T$ may be defined by the apparatus 500 based on different setting, for example, image restricted setting, or image unrestricted setting. $C_T$ denotes a total covariance of data, and may be derived by the apparatus 500 from a principal components analysis (PCA) and an LDA. The total covariance may preserve the global structure of the data, and may introduce more discriminative information. For example, a covariance matrix corresponding to learning vector data may include the above-described covariance matrixes $C_S$ and $C_T$.

Furthermore, in low-rank metric learning, the Mahalanobis-like distance matrix M may be assumed to be low-rank. Because $M=PP^T$, and a rank of $PP^T$ equals a rank of P, rank(M)=rank(P) may be represented. The above-described low-rank constraint and constraint of Equation 6 may be set as an objective function of Equation 7 by the apparatus 500 shown below.

$$\min_P \alpha \cdot rank(P) + \lambda \frac{tr(P^T C_S P)}{tr(P^T C_T P)} \qquad \text{[Equation 7]}$$

In Equation 7, $\alpha$ and $\lambda$ denote trade-off parameters. A supervised term may allow a projection matrix P to preserve more discriminative information. Additionally, rank(P) denotes a rank of the projection matrix P, and the projection matrix P may be transformed to an equivalent convex optimization problem using a nuclear norm. The projection matrix P with a low rank may preserve more "salient features." Low-metric learning may be transformed to low-rank subspace learning by the apparatus 500 using Equation 7. For example, Equation 7 may represent a function to obtain the projection matrix P so that a rank of the projection matrix P may be minimized, and that a covariance matrix-based metric calculation may be optimized (for example, data points in the same class may be set to move closer to each other, and data points in different classes may be set to move farther from each other).

The LRR may be used by the apparatus 500 to emphasize the global structure of the data, and to detect noise. The LRR may be a representation of data corresponding to a feature of an input image, and may include, for example, a matrix with a low rank, and the like. For more stable and robust model, a pre-learned low-dimensional feature may be used to fix one side of a low-rank constraint and accordingly, Equation 8 may be derived and used by the apparatus 500 as shown below.

$$\min_{Z,P,E} \|Z\|_* + \alpha \|P\|_* + \lambda \frac{tr(P^T C_S P)}{tr(P^T C_T P)} + \beta \|E\|_1 \qquad \text{[Equation 8]}$$

$$\text{s.t.} \quad P^T X = YZ + E,$$

Equation 8 may represent a function to obtain a rank of a coefficient matrix Z, a rank of a projection matrix P, a metric calculation based on covariance matrixes $C_S$ and $C_T$, the coefficient matrix Z, the projection matrix P, and an error matrix E.

In Equation 8, Y denotes a pre-learned low-dimensional feature, for example, pre-learned basis vector data. For example, $Y = P_0^T X$, and $P_0$ may be calculated in advance from Equation 6. Z denotes a coefficient matrix with a low rank, and may imply a global structure of data. YZ denotes an LRR. E denotes a sparse error term, and may represent a sparse error matrix. $\|\cdot\|_*$ denotes a nuclear norm, and $\|\cdot\|_1$ denotes a $l_1$-norm and may represent an absolute element sum of a matrix. $\beta$ denotes a balanced parameter.

Based on Equation 8, the LRR may be introduced both on the projection matrix P and the coefficient matrix Z. By applying the LRR, redundant features may be removed from vector data, and the global structure of the data may be emphasized. A supervised term on the projection matrix P may preserve more discriminative information.

According to an example embodiment, a constraint applied by the apparatus 500 in Equation 8 may be $P^T X = YZ + E$. $P^T X = YZ + E$ may be more stable and robust by introducing a pre-learned low-dimensional feature (for example, YZ), in comparison to $P^T X = P^T YZ + E$ according to the related art. For example, in the related art, it may be difficult to preserve stability due to excessively flexible optimizing of data on both sides. However, according to an example embodiment, the pre-learned low-dimensional feature may be used to fix one side of the constraint of Equation 8, and a pre-learned projection may represent more discriminative structure. In addition, in a low-rank constraint in which Y is a low-dimensional discriminative feature, the projection matrix P may derive more discriminative information from the input image X when the projection matrix P is reconstructed by Y.

To optimize the coefficient matrix Z, the projection matrix P and the error matrix E satisfying the constraint of Equation 8, two relax variables J and Q may be introduced for Equation 8 and accordingly, Equation 8 may be converted to a minimization problem to be used by the apparatus 500 as shown in Equation 9 below.

$$\min_{Q, P, Z, J, E} \|J\|_* + \lambda tr(P^T \mathcal{L} P) + \alpha \|Q\|_* + \beta \|E\|_1, \quad \text{[Equation 9]}$$
$$\text{s.t.} \quad P^T X = YZ + E, Z = J, Q = P, P^T P = I$$

In Equation 9, $\mathcal{L} = \mathcal{CS} - \gamma \mathcal{CC}_T$ denotes a trace difference replacement of a trace-ratio. An orthogonal constraint $P^T P = I$ may be imposed to ensure that the obtained projection matrix P is a basis transformation matrix.

To achieve better convergence for an objective function, an augmented Lagrangian multiplier may be applied by the apparatus 500. For example, an augmented Lagrangian function may be represented as shown in Equation 10 below.

$$\|J\|_* + \lambda tr(P^T \mathcal{L} P) + \alpha \|Q\|_* + \beta \|E\|_1 + \quad \text{[Equation 10]}$$
$$\langle Y_1, Z - J \rangle + \langle Y_2, P - Q \rangle + \langle Y_3, P^T X - YZ - E \rangle +$$
$$\frac{\mu}{2}(\|Z - J\|_F^2 + \|P - Q\|_F^2 + \|P^T X - YZ - E\|_F^2),$$

In Equation 10, $Y_1$, $Y_2$, and $Y_3$ denote Lagrange multipliers, and $\mu > 0$ indicates a penalty parameter. $\langle , \rangle$ denotes an inner product of matrixes. $\|\cdot\|_F$ denotes a Frobenius norm. In Equation 10, the above parameters may be optimized by the apparatus 500 one by one in an iterative manner, using an alternating direction method of multipliers (ADMM).

For example, processes of the ADMM may be represented as an algorithm of Table 1 shown below. Process 1 may be solved by singular value thresholding (SVT). Processes 3 and 5 may be solved by a shrinkage operator. Parameters $\mu$, $\rho$, $\epsilon$, maxIter, and $\max_\mu$ may be empirically set, and the other balanced parameters may be tuned based on empirical data.

TABLE 1

Input: X, $\lambda$, $\alpha$, $\beta$, $\mathcal{C_S}$, $\mathcal{C_T}$, Y
Initialize: Z = J = 0, Q = 0, E = 0, $Y_1 = Y_2 = Y_3 = 0$, t = 0, $\epsilon = 10^{-5}$,
$\mu = 10^{-4}$, $\rho = 1.2$, $\max_{\mu = 10^6}$, $maxIter = 10^3$
while not converged or t < maxIter do
1. Fix the other and update J by $$Q = \arg\min_Q \frac{\alpha}{\mu} \|Q\|_* + \frac{1}{2} \|Q - (P + Y_2/\mu)\|_F^2$$

2. Fix the others and update P by
$P = (2\lambda \mathcal{L} + \mu XX^T + \mu I)^{-1}(\mu X(YZ - E)^T - XY_3^T - \mu Q - Y_2)$, $P \leftarrow \text{orth}(P)$
3. Fix the others and update J by $$J = \arg\min_J \frac{1}{\mu} \|J\|_* + \frac{1}{2} \|J - (Z + Y_1/\mu)\|_F^2$$

4. Fix the others and update Z by
$Z = (2I + Y^T Y)^{-1}(Y^T(P^T X - E) + J + (Y^T Y_3 - Y_1)/\mu)$
5. Fix the others and update E by $$E = \arg\min_E \frac{\beta}{\mu} \|E\|_1 + \frac{1}{2} \|E - (P^T X - YZ + Y_3/\mu)\|_F^2$$

6. Update the multipliers Y1, Y2, Y3
$Y_1 = Y_1 + \mu(Z - J)$; $Y_2 = Y_2 + \mu(P - Q)$; $Y_3 = Y_3 + \mu(P^T X - YZ - E)$.
7. Update the paramerts $\mu$ by $\mu = \min(\rho \mu, \max_\mu)$.
8. Check the convergence conditions
$\|Z - J\|_\infty < \epsilon$, $\|P - Q\|_\infty < \epsilon$, $\|P^T X - YZ - E\|_\infty < \epsilon$
9. t = t + 1.
end while
Output: Z, J, E, P, Q An input image X may be assumed as an "n×m" matrix in which n denotes the original dimension, and m denotes a size of data. P may be an "n×p" matrix in which p denotes a dimension of a projected space. In the algorithm of Table 1, time-consuming components may include trace norm computation in processes 1 and 3, and matrix multiplication and inverse in processes 2 and 4.

In association with computation complexity of the algorithm of Table 1, SVT computation in process 1 may cost $O(p^3)$, and process 3 may cost $O(m^3)$. For the "n×m" matrix, a general multiplication may each cost $O(n^3)$, and inverse may also cost $O(n^3)$. Due to k multiplications, processes 2 and 4 may cost $(k+1)O(p^3)$ and $(k+1)O(n^3)$, respectively.

The algorithm of Table 1 may have a higher recognition performance, in comparison to the related art, and may exhibit very quick and stable performance when a number of optimization iterations increases.

Figure 6:
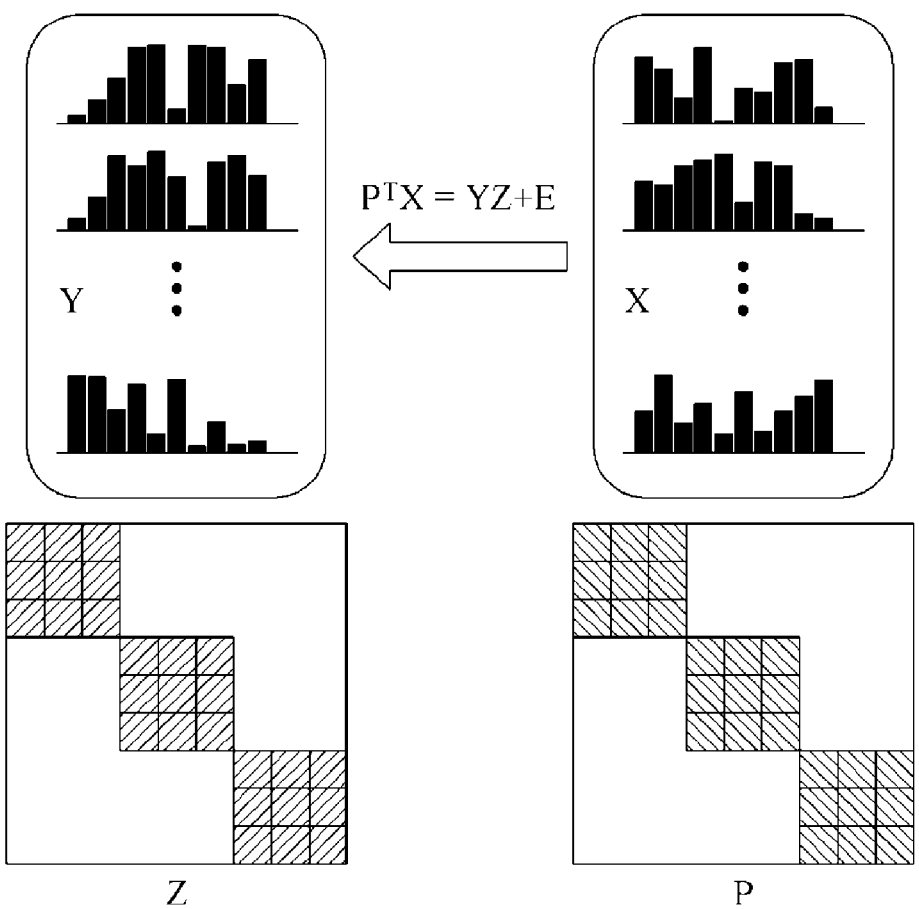
FIG. 6 illustrates an example of each of first-dimensional vector data, a coefficient matrix, and a projection matrix according to at least one example embodiment.

FIG. 6 illustrates an example of each of first-dimensional vector data, a coefficient matrix, and a projection matrix according to at least one example embodiment.

FIG. 6 illustrates first-dimensional vector data X associated with an input image, a projection matrix P with a low rank, a coefficient matrix Z, and pre-learned basis vector data Y.

For example, second-dimensional vector data $P^T X$ generated by reflecting the projection matrix P to the first-dimensional vector data X may be identical to vector data YZ+E including the sparse error matrix E and a product of the pre-learned basis vector data Y and the coefficient matrix Z, as shown in the constraint of Equation 8.

When the projection matrix P is reflected to the first-dimensional vector data X, second-dimensional vector data $P^TX$ may be generated. For example, a first dimension of first-dimensional vector data may be higher than a second dimension of second-dimensional vector data. The first dimension and the second dimension may be, for example, a high dimension and a low dimension, respectively.

Figure 7:
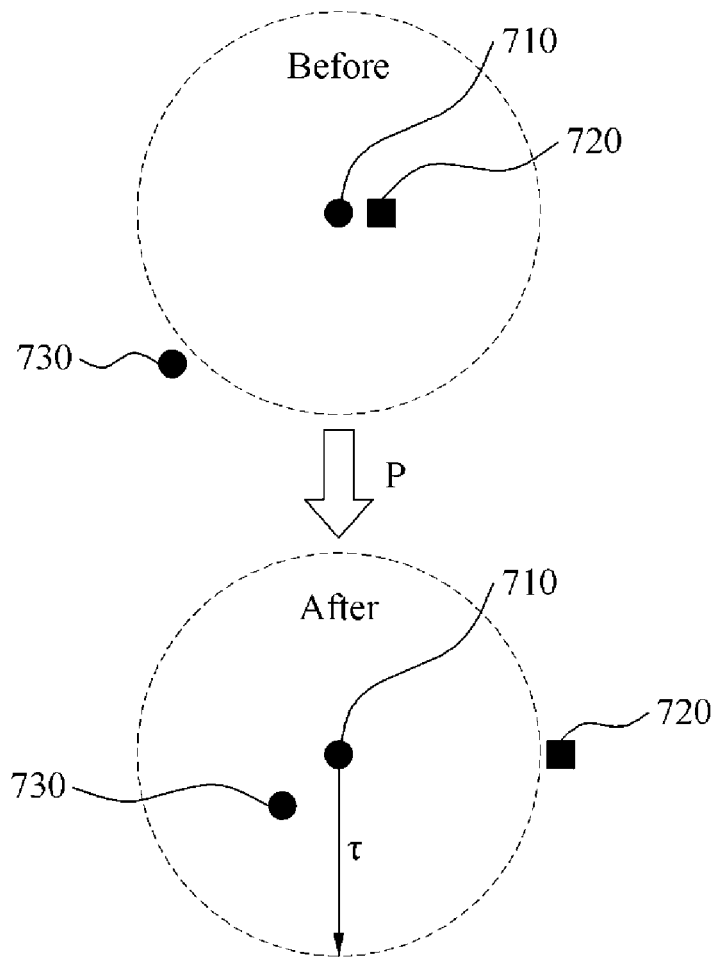
FIG. 7 illustrates a change in a location of vector data to which a projection matrix is reflected according to at least one example embodiment.

FIG. 7 illustrates a change in a location of vector data to which a projection matrix is reflected according to at least one example embodiment.

In FIG. 7, arbitrary three data points 710, 720 and 730 of the vector data may form a space. An upper portion of FIG. 7, indicated by "Before," illustrates three data points of first-dimensional vector data, and a lower portion of FIG. 7, indicated by "After," illustrates three data points of second-dimensional vector data. The second-dimensional vector data may be generated by reflecting a projection matrix to the first-dimensional vector data, that is, by converting the first-dimensional vector data using the projection matrix.

For example, the data points 710 and 730 corresponding to a first class may be represented by circles, and the data point 720 corresponding to a second class may be represented by a square.

In the first-dimensional vector data as shown in the upper portion of FIG. 7, the data point 710 corresponding to the first class is located close to the data point 720 corresponding to the second class, and a long distance between the data points 710 and 730 corresponding to the first class is calculated. In the second-dimensional vector data as shown in the lower portion of FIG. 7, the data point 710 corresponding to the first class is located far away from the data point 720 corresponding to the second class, and a short distance between the data points 710 and 730 corresponding to the first class is calculated.

Figure 8:
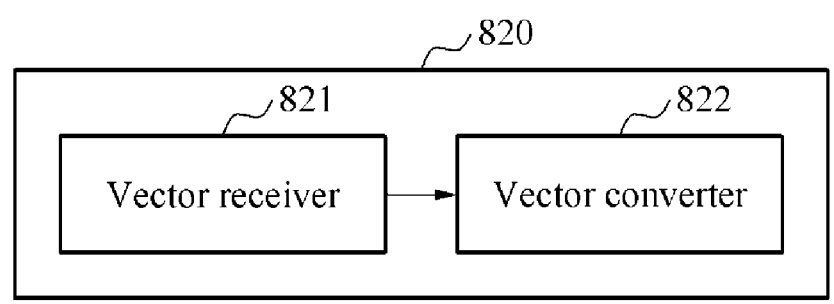
FIG. 8 illustrates an apparatus for converting a vector corresponding to an input image according to at least one example embodiment.

FIG. 8 illustrates an apparatus 820 for converting a vector corresponding to an input image according to at least one example embodiment.

Referring to FIG. 8, the apparatus 820 may include a vector receiver 821, and a vector converter 822.

The vector receiver 821 may receive first-dimensional vector data associated with an input image including an object. The first-dimensional vector data may be represented by X. The first-dimensional vector data may have, for example, a form of vector data of the input image, or a form of vector data of a feature of the input image.

The vector converter 822 may convert the received first-dimensional vector data to second-dimensional vector data based on a projection matrix. The projection matrix, and the second-dimensional vector data may be represented by P, and $P^TX$, respectively.

The apparatus 820 may operate as the feature converter 320 of FIG. 3 and the feature converter 422 of FIG. 4. For example, the vector receiver 821 may receive vector data extracted by the vector extractor 310 of FIG. 3 and the vector extractor 421 of FIG. 4.

Figure 9:
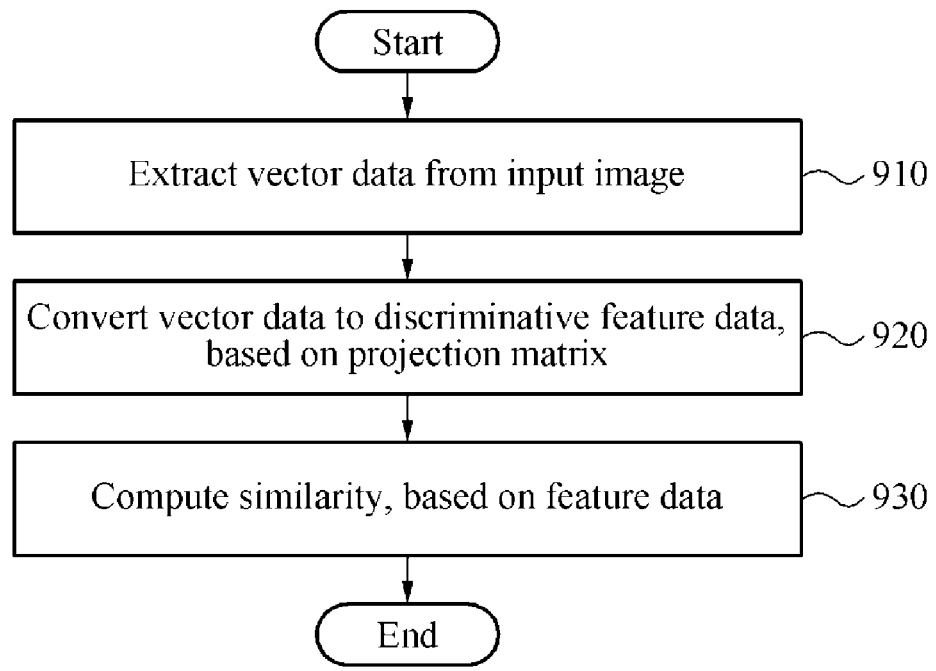
FIG. 9 illustrates a method of converting an input image including an object to discriminative feature data according to at least one example embodiment.

FIG. 9 illustrates a method of converting an input image including an object to discriminative feature data according to at least one example embodiment.

Referring to FIG. 9, in operation 910, a vector extractor may extract vector data associated with the input image from the input image. For example, the vector extractor may extract, as vector data, the input image or a feature of the input image.

In operation 920, a feature converter may extract a feature based on a projection matrix. For example, the feature converter may convert the extracted vector data to discriminative feature data based on a projection matrix that is generated based on a covariance matrix corresponding to learning vector data and that has a low rank. For example, the feature converter may convert first-dimensional vector data X corresponding to an input image to second-dimensional vector data $P^TX$, by applying a projection matrix P to the first-dimensional vector data X. The feature converter may extract a feature based on the above-described operations of FIGS. 3 and 4.

In operation 930, a determiner may compute similarity based on the discriminative feature data. For example, the determiner may compute similarity or a distance between pieces of vector data corresponding to feature data of images based on Equation 2 or 3.

Figure 10:
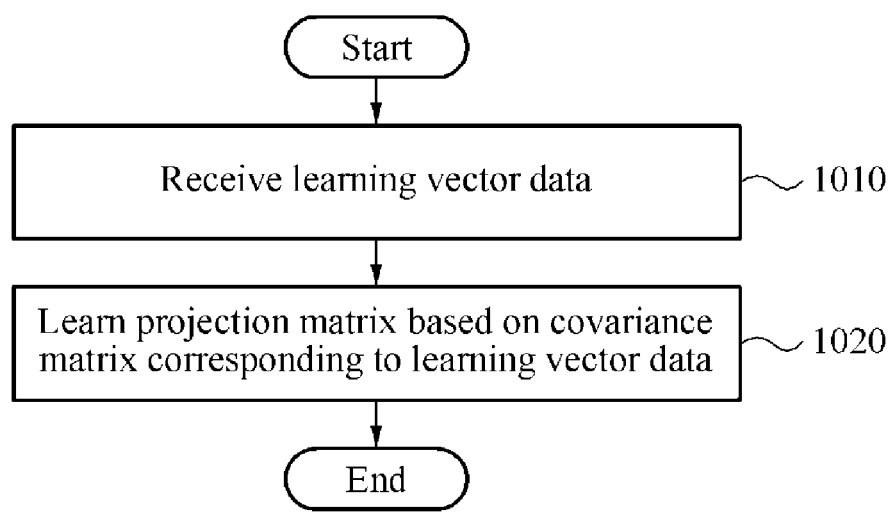
FIG. 10 illustrates a method of learning a projection matrix to convert a dimension of vector data associated with an input image according to at least one example embodiment.

FIG. 10 illustrates a method of learning a projection matrix to convert a dimension of vector data associated with an input image according to at least one example embodiment.

Referring to FIG. 10, in operation 1010, a learning vector receiver may receive learning vector data. For example, the learning vector receiver may receive learning vector data corresponding to each of a plurality of learning images.

In operation 1020, a projection matrix learner may learn a projection matrix based on a covariance matrix corresponding to the learning vector data. Additionally, the projection matrix learner may learn a projection matrix with a low rank from the learning vector data.

In an example, the projection matrix learner may determine the projection matrix so that a rank of the projection matrix may be lower than a predetermined and/or rank threshold.

In another example, the projection matrix learner may determine the projection matrix so that a difference between elements corresponding to the same object in the learning vector data may be minimized and that a difference between elements corresponding to different objects in the learning vector data may be maximized, in order to acquire more discriminative information based on Equation 6.

In still another example, the projection matrix learner may learn the projection matrix based on Equation 8. The projection matrix learner may determine the projection matrix so that vector data corresponding to the input image to which the projection matrix is reflected may be identical to vector data including a sparse error matrix and a product of pre-learned basis vector data and a coefficient matrix. The projection matrix learner may determine the projection matrix based on a covariance matrix-based metric calculation (for example, Equations 6 and 8), a rank of the coefficient matrix, and a rank of the projection matrix. The projection matrix learner may generate pre-learned basis vector data based on a covariance matrix corresponding to the learning vector data.

The learning of the projection matrix may be performed based on the above-description with reference to FIGS. 5 through 7, however, there is no limitation thereto. Accordingly, the projection matrix learner may learn the projection matrix, using a computation scheme, all algorithms to achieve the constraint of Equation 8, and the like.

Figure 11:
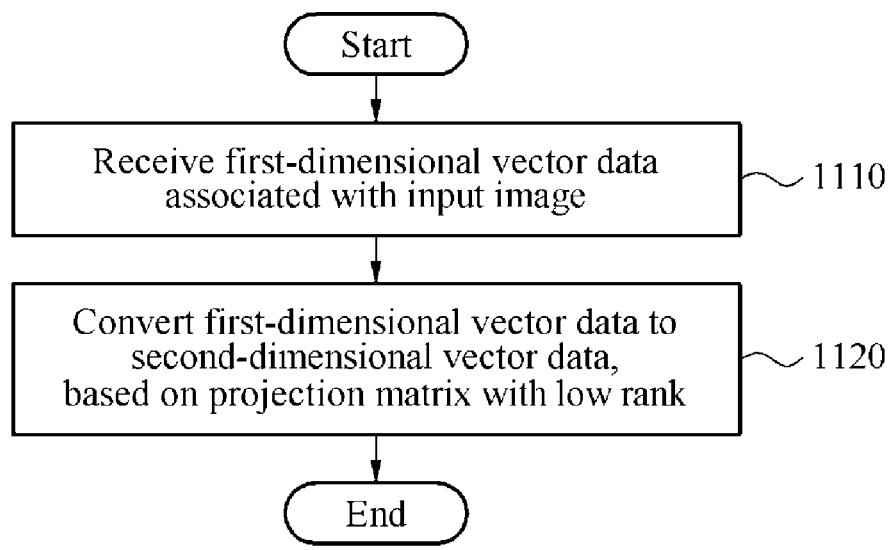
FIG. 11 is a flowchart illustrating a method of converting a vector corresponding to an input image according to at least one example embodiment.

FIG. 11 illustrates a method of converting a vector corresponding to an input image according to at least one example embodiment.

Referring to FIG. 11, in operation 1110, a vector receiver may receive first-dimensional vector data associated with the input image. For example, the vector receiver may receive first-dimensional vector data associated with an input image including an object.

In operation 1120, a vector converter may convert the first-dimensional vector data to second-dimensional vector data based on a projection matrix with a low rank. A first dimension of the first-dimensional vector data may be higher than a second dimension of the second-dimensional vector data.

The projection matrix and the basis vector data may be learned by the method of FIG. 10.

For example, in operation 1110, the vector receiver may receive first-image vector data associated with a first image, and second-image vector data associated with at least one second image. In this example, in operation 1120, the vector converter may convert a dimension of each of the first-image vector data and the second-image vector data to a second dimension based on the projection matrix. The determiner may compare the first image to each of the at least one second image based on the first image vector data and the second image vector data that correspond to the second dimension.

The units and/or modules described herein may be implemented using hardware components and/or hardware components executing software components (e.g., a processor executing software instructions stored on a memory (e.g., 431 and 432)). For example, the apparatus 300, the apparatus 400, the apparatus 500 and the apparatus 820 may include hardware components and/or hardware components executing software components configured to perform the functions described above. More specifically, the vector extractor 310, the feature converter 320, image receiver 410, object detector 411, object normalizer 412, vector extractor 421, feature converter 422, determiner 430, learning vector receiver 510, projection matrix learner 520, vector receiver 821 and vector converter 822 may include hardware components and/or hardware components executing software components configured to perform the functions described above. The hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions stored in memory in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. An object recognition method, the method comprising:
receiving first-dimensional vector data associated with an input image, the input image including an object;
converting the received first-dimensional vector data to second-dimensional vector data based on a projection matrix with an associated rank, the converting including,
converting the received first dimensional vector data to the second-dimensional vector data such that the second-dimensional vector data is same as desired vector data, the desired vector data including a sparse error matrix and a product of basis vector data and a coefficient matrix, wherein a first dimension of the first-dimensional vector data is higher than a second dimension of the second-dimensional vector data; and
performing object recognition based on the second-dimensional vector data.
2. The method of claim 1, wherein the associated rank of the projection matrix is lower than a set rank threshold.
3. The method of claim 1, wherein the projection matrix is based on a covariance matrix corresponding to learning vector data, the learning vector data corresponding to learning images.

4. The method of claim 1, wherein the projection matrix is based on a covariance matrix-based metric calculation, a rank of the coefficient matrix, and the associated rank of the projection matrix.

5. The method of claim 1, wherein the basis vector data is based on the input image and a covariance matrix corresponding to learning vector data.

6. The method of claim 1, wherein the receiving receives first-image vector data associated with a first image and second-image vector data associated with at least one second image, the converting converts a dimension of each of the first-image vector data and the second-image vector data to the second dimension based on the projection matrix, and wherein the method further comprises:

comparing the first image and each of the at least one second image based on the first-image vector data and the second-image vector data corresponding to the second dimension.

7. The method of claim 1, wherein the associated rank is a state in which the projection matrix has a minimum rank value.

8. A method of learning a projection matrix to convert a dimension of obtained vector data associated with an input image including an object, the method comprising:

receiving learning vector data corresponding to each of a plurality of learning images;

learning the projection matrix from the learning vector data, the projection matrix having an associated rank; and determining the projection matrix such that the obtained vector data is identical to desired vector data, the desired vector data including a sparse error matrix and a product of basis vector data and a coefficient matrix;

wherein the determined projection matrix is used to perform an object recognition.

9. The method of claim 8, wherein the learning comprises:

determining the projection matrix such that the associated rank of the projection matrix is lower than a set rank threshold.

10. The method of claim 8, wherein the learning comprises:

generating the projection matrix based on a covariance matrix corresponding to the learning vector data.

11. The method of claim 8, wherein the learning comprises:

determining the projection matrix such that a difference between elements corresponding to a same object in the learning vector data decreases and that a difference between elements corresponding to different objects in the learning vector data increases.

12. The method of claim 8, wherein the learning comprises:

determining the projection matrix based on a covariance matrix-based metric calculation, a rank of the coefficient matrix, and the associated rank of the projection matrix.

13. The method of claim 8, wherein the learning comprises:

generating the basis vector data from the input image based on a covariance matrix corresponding to the learning vector data.

14. The method of claim 8, wherein the associated rank is a state in which the projection matrix has a minimum rank value.

15. An object recognition method, the method comprising:

extracting vector data associated with an input image from the input image;

converting the extracted vector data to discriminative feature data based on a projection matrix, the projection matrix being based on first and second covariance matrices corresponding to learning vector data, the projection matrix having an associated rank; and performing object recognition based on the discriminative feature data.

16. The method of claim 15, wherein the extracting comprises:

receiving the input image;

detecting an object area including the object from the input image; and normalizing the input image based on the object area.

17. The method of claim 15, further comprising:

computing a similarity based on the discriminative feature data and feature data extracted from another image; and determining the object to be identical to an object in the another image, if the similarity is greater than a threshold.

18. The method of claim 15, further comprising:

computing a similarity based on the discriminative feature data and stored feature data, the stored feature data corresponding to a plurality of selected objects; and determining the object from the input image to be identical to one of the plurality of selected objects if the similarity is greater than a set threshold.

19. The method of claim 15, wherein the associated rank is a state in which the projection matrix has a minimum rank value.

20. The method of claim 15, wherein the first covariance matrix is an intra-personal covariance matrix.

21. The method of claim 20, wherein the second covariance matrix is a total covariance matrix.

22. An object recognition apparatus, the apparatus comprising:

a memory storing computer-readable instructions; and at least one processor configured to execute the computer-readable instructions to, receive first-dimensional vector data associated with an input image, the input image including an object, convert the received first-dimensional vector data to second-dimensional vector data based on a projection matrix such that the second-dimensional vector data is same as desired vector data, the desired vector data including a sparse error matrix and a product of basis vector data and a coefficient matrix, and perform object recognition based on the second-dimensional vector data.

23. An apparatus for learning a projection matrix to convert a dimension of obtained vector data associated with an input image including an object, the apparatus comprising:

a memory storing computer-readable instructions; and at least one processor configured to execute the computer-readable instructions to, receive learning vector data corresponding to each of a plurality of learning images, learn the projection matrix from the learning vector data, the projection matrix having an associated rank, and determine the projection matrix such that the learning vector data is identical to desired vector data, the desired vector data including a sparse error matrix and a product of basis vector data and a coefficient matrix,
wherein the determined projection matrix is used to perform an object recognition.

24. The apparatus of claim 23, wherein the associated rank is a state in which the projection matrix has a minimum rank value.

\* \* \* \* \*

UNITED STATES PATENT AND TRADEMARK OFFICE
CERTIFICATE OF CORRECTION

| | | |
|---|---|---|
| PATENT NO. | : 9,959,457 B2 | Page 1 of 1 |
| APPLICATION NO. | : 14/858082 | |
| DATED | : May 1, 2018 | |
| INVENTOR(S) | : Sungjoo Suh et al. | |

It is certified that error appears in the above-identified patent and that said Letters Patent is hereby corrected as shown below:

On the Title Page

Inventors should read:
Sungjoo SUH, Seoul, (KR);
Yun FU, Boston, MA (US);
Zhengming DING, Boston, MA (US);
Chang Kyu CHOI, Seongnam-si, (KR);
Jaejoon HAN, Seoul, (KR)

Signed and Sealed this
Ninth Day of October, 2018

Andrei Iancu
*Director of the United States Patent and Trademark Office*